United States Patent [19]
Cresgy

[11] Patent Number: 5,927,935
[45] Date of Patent: Jul. 27, 1999

[54] PART TRANSFER APPARATUS

[75] Inventor: Joseph Dale Cresgy, Terre Haute, Ind.

[73] Assignees: Sony Corporation, Tokyo, Japan; Digital Audio Disc Corporation, Terre Haute, Ind.

[21] Appl. No.: 09/080,431

[22] Filed: May 18, 1998

[51] Int. Cl.$^6$ ................................................. B25J 18/04
[52] U.S. Cl. ........................... 414/751; 414/222; 384/55; 198/468.2
[58] Field of Search ......................... 198/468.2; 414/749, 414/751, 752, 753, 222; 901/17; 384/26, 42, 55

[56] References Cited

U.S. PATENT DOCUMENTS

| | | | |
|---|---|---|---|
| 2,804,963 | 9/1957 | Nowak | 414/752 |
| 3,648,854 | 3/1972 | Potter | 414/751 |
| 3,760,956 | 9/1973 | Burch | 901/17 |
| 3,897,119 | 7/1975 | McMurrie | 384/55 |
| 4,652,204 | 3/1987 | Arnett | 901/17 |
| 5,059,089 | 10/1991 | Kocaoglan | 901/17 |

OTHER PUBLICATIONS

Festo, Non–rotating, Elliptical Piston Cylinders, Type DZH, p. 99.
phd, Slides, Series N, S, SD & SE, SK & SL, T, R, M, C, SG, and B, p. 5–1.
Festo, Non–rotating Linear Guide Units, Jul., 1992, p. 1.
Festo, Pneumatic Twin Cylinders, Jan., 1995, p. 156.
Bimba Manufacturing Company, Bimba Linear Thruster, 1996, p. 2.
SMC, Guide Cylinder Series MGG, Cat. E226–A.
SMC, Dual Rod Cylinder Series CXS, CAT. E227–A.

*Primary Examiner*—David A. Bucci
*Assistant Examiner*—Gregory A. Morse
*Attorney, Agent, or Firm*—Wood, Herron & Evans, L.L.P.

[57] ABSTRACT

A part transfer apparatus having a first element with a longitudinal slot extending along one side and a second element having a similar longitudinal slot. The slots are disposed adjacent to each other. An actuator is connected to the first element and has a movable rod connected to the second element. A first guide block is mounted to one end of the second element and has a key disposed within the slot of the first element. A second guide block is mounted to an end of the first element and has a key disposed in the slot of the second element. The keys and slots function to guide the second element with respect to the first element. A part support is mounted on the second element for receiving a part.

22 Claims, 2 Drawing Sheets

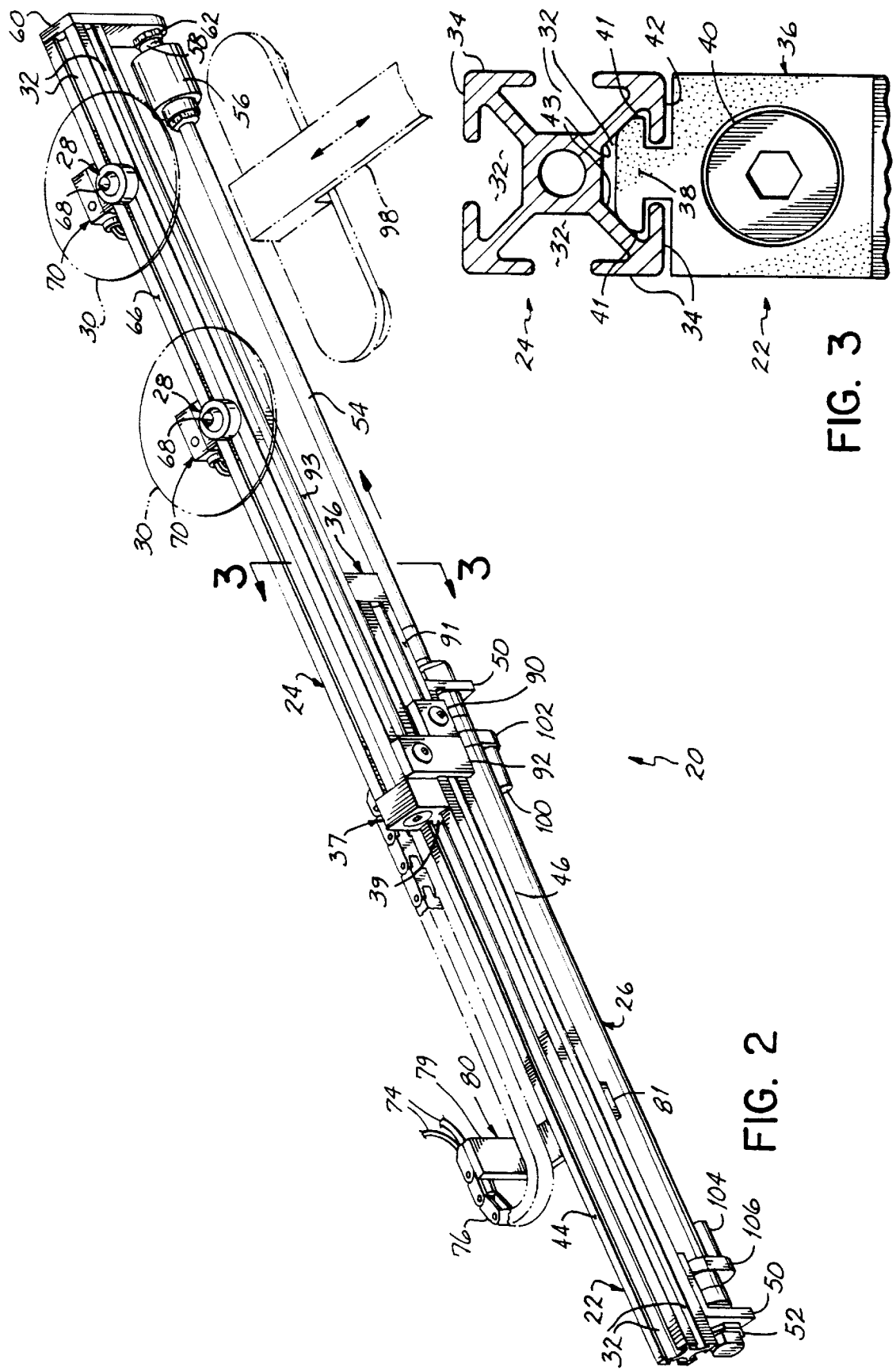

1

PART TRANSFER APPARATUS

BACKGROUND OF THE INVENTION

This invention relates generally to material handling and more particularly, to an improved part transfer apparatus.

Ongoing efforts to increase the efficiency and output of production operations have resulted in a continuing focus on how materials are moved with respect to the operations being performed. Often part processing machines and stations are separated by significant distances, and parts being processed are moved on conveyors between the processing machines and stations. In an effort to optimize the utilization of floor space, processing machines and stations are being moved into closer proximity. Generally each machine or processing station has a dedicated material handling device that loads the machine or station by picking up a part from an input position and thereafter, unloads the machine or station by depositing the part at a discharge position. The input and discharge positions are often the same position.

Thus, as one machine or station is brought into proximity with another machine or station, the parts must be transferred from the discharge position of one machine or station to the load position of the other machine or station. The path of the part transfer may require only a horizontal transfer of the parts, or the transfer may require that the parts be moved along horizontal and vertical paths. Further, the machines may be in such close proximity that a conveyor device is too large; and therefore, other material handling devices must be considered.

There are many commercially available devices for transferring a part from one location to another. For example, linear slides are commercially available which utilize a pneumatic cylinder to provide relative linear motion between the cylinder body and a cylinder piston or rod. Often, two cylinder rods or a noncylindrical cylinder rod are used so that there is no relative rotation between the cylinder body and rods, and the cylinder provides a stable support under load. While the commercially available units are useful in a great many applications, the commercially available units have several limitations. For example, when moving parts between stations located at opposite ends of the cylinder stroke, it is often necessary for the part to be accurately placed with respect to each of the stations. While many cylinders have the ability to finely adjust the end position at one end of the stroke, such cylinders do not provide the capability of finely adjusting the end position at the other end of the stroke. One can attempt to adjust the mounting location of the cylinder to achieve that purpose, however such an adjustment is coarse and difficult to use with any degree of precision.

Generally commercially available cylinders have only a relatively small block that moves between the ends of the stroke. Further, the block generally has no significant dimension in the direction of part motion, and therefore, if multiple parts are to be used or part detectors are to be used, special tooling must be designed for the moving block which substantially increases the cost, size and weight of the part transfer device. In addition, often it is required that a horizontal cylinder be attached to an elevator device such as a vertical cylinder. Therefore, the weight of the cylinder assembly is important, and any increase in the weight of the whole cylinder unit adversely impacts the design of the elevator unit. It is also important that the cylinder unit be kept as small as possible. As processing stations are brought closer together, any auxiliary equipment must kept to a minimal size, so that there is minimal interference in the space between machines. Such space is required for machine maintenance and therefore, must remain minimally obstructed, or such obstructions must be designed so that they can be readily moved to a noninterfering location.

Consequently, there is a need for a part transfer device that does not have the limitations and disadvantages of known devices for transferring parts from one location to another.

SUMMARY OF THE INVENTION

The present invention provides a simple, compact, inexpensive and reliable part transfer apparatus that may be used to transfer parts between material handling devices associated with machines, processing stations, conveyors, etc. The part transfer apparatus of the present invention permits the positions at both ends of the part transfer stroke to be finely adjusted so that the apparatus can be easily interfaced with adjacent equipment. The part transfer apparatus of the present invention is especially useful in moving light weight parts between closely spaced machines and processing stations.

According to the principals of the present invention and in accordance with the preferred embodiment, a part apparatus has a first element with a longitudinal slot extending along one side of the first element. A second element having a second longitudinal slot along one side is disposed next to the first element with the slotted sides adjacent each other. An actuator is connected to the first element and has a moving element connected to one end of the second element. A first guide block is mounted on an opposite end of the second element and the first guide block has a first guide key disposed within the first slot of the first element to guide the motion of the opposite end of the second element. A second guide block is mounted on an opposite end of the first element. The second guide block also has a guide key which is disposed in the second slot of the second element. The second guide key guides motion of the second element with respect to the first element. A support is mounted on the second element for receiving and supporting a workpiece.

In one aspect of the invention, the slots and the guide keys are generally T-shaped. In another aspect of the invention, the actuator selectively moves the second element between first and second preset positions which are adjustable positions. In accordance with a further aspect of the invention, the second element includes a plurality of supports in a spaced apart relationship on the second element for receiving a plurality of parts. In addition, a plurality of part detectors are mounted on the second element in the proximity of the respective plurality of supports for detecting the presence of the plurality of parts.

These and other objects and advantages of the present invention will become more readily apparent during the following detailed description taken in conjunction with the drawings herein.

BRIEF DESCRIPTION OF THE INVENTION

FIG. 2 is a perspective view of an opposite side of the part transfer device at an opposite end of its travel in accordance with the principles of the present invention.

FIG. 3 is a partial cross-sectional view taken along line 3—3 of FIG. 2.

DETAILED DESCRIPTION OF THE INVENTION

Figure 1:
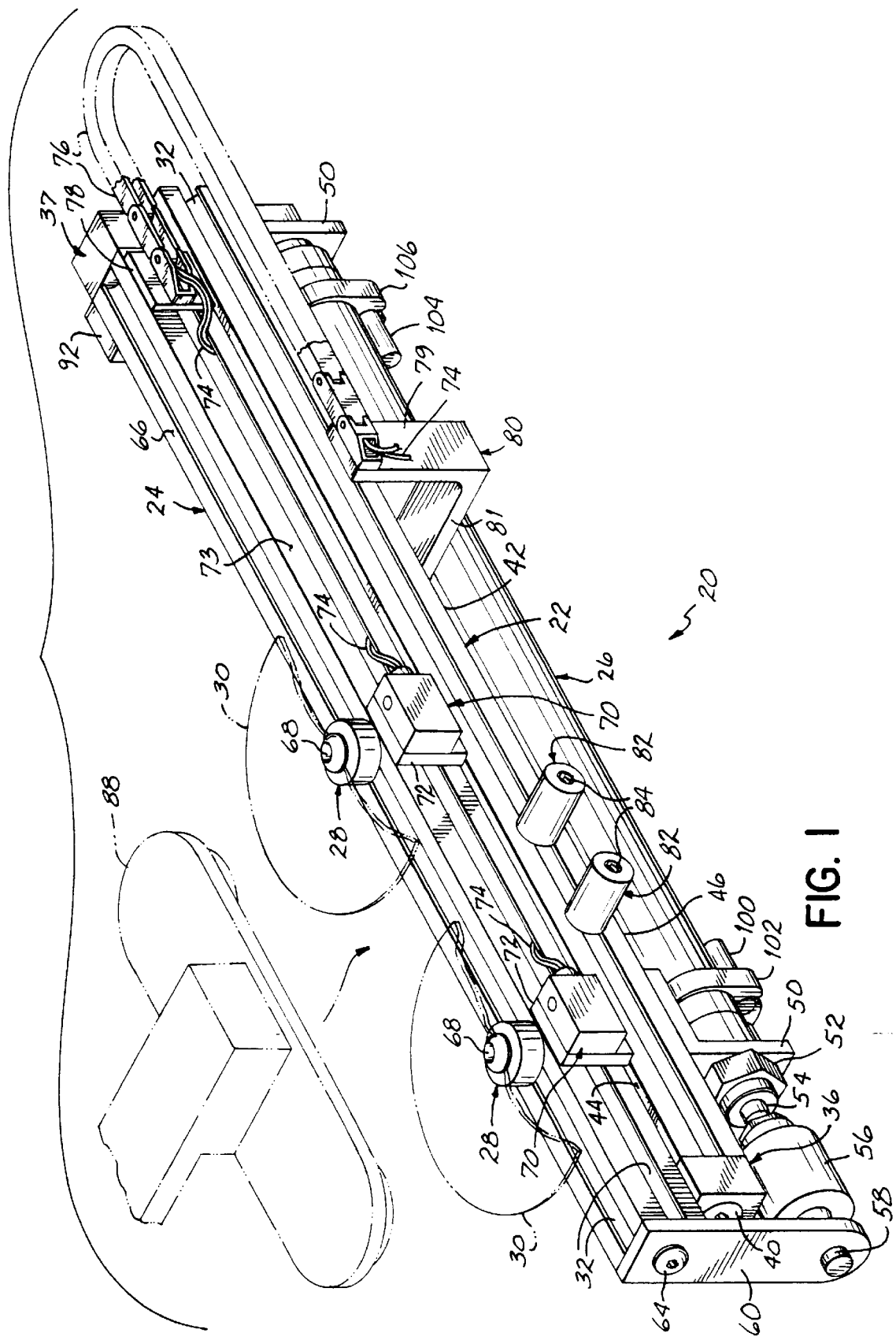
FIG. 1 is a perspective view of one side of a part transfer device at one end of its travel in accordance with the principles of the present invention.

Referring to FIG. 1, the part transfer apparatus 20 of the present invention is comprised of a fixed member 22, a movable slide member 24 and an actuator 26 operatively coupled between the fixed member 22 and the sliding member 24. The sliding member further includes supports 28 for workpieces or parts 30 (shown in phantom). The part transfer apparatus 20 of FIG. 1 is illustrated in its retracted position. The actuator is selectively operated to move the sliding member between the illustrated retracted position of FIG. 1 and an extended position illustrated in FIG. 2.

The fixed and movable members 22, 24 are made from extruded aluminum bar stock having a square cross-section (FIG. 3) with a generally T-shaped longitudinal slot 32 in each of its 4 sides 34. The members 22, 24 are commercially available from Item Products, Inc. of Livonia, Mich. Each of the members 22, 24 (FIG. 1) has an end guide block 36, 37 with a peripheral square cross-section generally the same size of the cross-section of the members 22, 24 (FIG. 3). The end blocks 36, 37 have respective projecting, generally T-shaped guide keys 38, 39 with a cross-sectional shape such that the guide keys 38, 39 smoothly track inside the slots 32. The guide block 36 is mounted on a first end of the fixed member 22 by means of a fastener 40. The guide key 38 for the guide block 36 is located in a slot on the bottom surface 42 of the sliding member 24. As shown in FIG. 3, the guide keys 38, 39 have chamfered surfaces 41 which bear against and support side surfaces 43 of the slot 32 within the second element 24. Thus, the second element 24 rides on the guide keys 38, 39 and does not touch the fixed, lower element 22. The guide blocks 36, 37 are normally made from an ultra-high molecular weight, low friction, self-lubricating material which is commercially available from Item Products, Inc. Referring to FIG. 2, the guide block 37 is attached to a second or opposite end of the sliding member 24 and has an associated guide key 39 disposed in a slot 32 of an upper surface 44 of the fixed member 22. Thus, the sliding member 24 will always move in a direction generally parallel to the fixed member 22.

Referring to FIG. 1, the actuator 26 may be an ISO 6432, type DSNU, double acting pneumatic cylinder with flexible cushion rings, for example, a model "Sprinter 2000" commercially available from Festo Corporation, Hauppage, N.Y. The cylinder 26 is mounted to the lower surface 46 of the fixed member 22 by means of angle brackets 50. The angle brackets 50 may be mounted to the bottom surface 46 of the fixed member 22 in a fixed manner by fasteners extending through or threaded into the fixed member 22. In other circumstances, it may be desirable to adjustably mount the brackets 50 to the fixed member 22 by fasteners extending into bolts located in the slot 32 on the lower surface 46 of the fixed member 22. Mounting nuts 52 are used to secure the cylinder 26 to the angle brackets 50. The distal end of the cylinder piston or rod 54 is threaded into one end of a rod aligner 56, for example, a model FK commercially available from Festo Corporation. A threaded shaft 58 extends from the opposite end of the rod aligner 56 such that the shaft 58 has a limited swiveling motion with respect to the opposite end of the rod aligner 56. The shaft 58 is threaded into one end of a coupling bracket 60 and secured thereto by a lock nut 62 (FIG. 2). The opposite end of the coupling bracket 60 is attached near, and preferably to, a first end of the sliding member 24 by means of a fastener 64 (FIG. 1) threaded into the one end of the sliding member 24.

The supports 28 may be made of anodized aluminum and secured to the top surface 66 of the sliding member 24 by fasteners (not shown) extending through a central bore 68 of each of the supports 28. The supports may be permanently fixed in their desired positions on the sliding member 24 by threading their fasteners into the member 24. Alternately, the supports 28 may be adjustably positioned by threading the fasteners into nuts located within the slot 32 in the upper surface 66. Part sensors 70 are attached to respective mounting blocks 72 which in turn are mounted to the side surface 73 of the sliding member 24. As described with respect to other components, the mounting blocks 72 are either permanently fastened to the sliding member 24 or adjustably mounted to the sliding member 24 utilizing the slots 32. The part detectors 70 may be, for example, a model EQ-20 series photoelectric sensor commercially available from Sunx Sensors of West DeMoines, Iowa. Signals from the sensors 70 are transmitted by cables 74 carried in a slot 32 of the second member 24. The cables 74 are carried off of the sliding member 24 by a chain 76, for example, a series E04 "PICO" energy chain commercially available from igus, inc, East Providence, R.I. The chain loop 76 carries the cables 74 throughout the linear sliding motion of the sliding element 24, so that the cables 74 do not interfere with the moving parts and do not crimp. One end of the chain 76 is attached to mounting plate 78 which is attached to the moving member 24 in a manner similar to the mounting plates 72. The other end of the chain 76 is connected to one leg 79 of a support bracket 80 which has a perpendicular leg 81 connected to the bottom surface 42 of the fixed member 22.

In use, the part transfer device 20 may be mounted to any other device or support utilizing the mounting bars 82. The inner ends of the mounting bars 82 are attached to the slot 32 by fasteners that thread into the threaded bores 84, and thus, the support bars 82 may be adjustably located at any position within the slot 32 on the fixed member 22. The outer ends of the mounting bars 82 may be fastened to a stationary support which holds the part transfer device 20 at a fixed elevation. Alternatively, the outer ends of the bars 82 may be attached to a moving element (not shown) of a vertically oriented cylinder so that the part transfer device 20 can be moved up and down to accommodate different elevations at its retracted and extending positions.

When the cylinder 26 is in a first, fully retracted position, illustrated in FIG. 1, the precise location of the supports 28 on the movable element 24 can be adjusted with respect to the fixed member 22 by adjusting the location of the coupling bracket 60 on the threaded shaft 58 of the rod aligner 56. Thus, the supports 28 can be precisely aligned with a transfer arm 88 that functions to place the disks 30 onto the supports 28. Upon the sensors 70 detecting the presence of the disks 30, part present signals are transferred along the cables 74 to a control (not shown), for example, a programmable logic controller. The controller operates in a known manner to operate a solenoid (not shown) which causes a pneumatic pressure to be applied on the left side, as viewed in FIG. 2, of the piston rod 54 within the cylinder 26. In the above cycle of operation, parts are loaded on the transfer arm in the retracted position and unloaded when the transfer arm is extended. As will be appreciated, alternatively, parts can be loaded on the extended transfer arm and unloaded when the arm is in the retracted position.

The piston rod 54 moves to the right carrying the disks 30 toward a second, extended position. A fixed stop 90 is attached at one end of a side surface 91 of the fixed element 22. A movable stop block 92 is attached at an opposite end of a side surface of the movable member 24. The actuator 26 moves the piston rod 54 and the sliding member 24 toward the extended position until the movable stop block 92 contacts the fixed stop block 90 which functions to stop the linear motion of the movable slide 24. The continued application of pneumatic pressure against the cylinder rod 54 holds the movable member 24 in the extended position.

The position of the fixed stop block 90 within the slot 32 may be adjusted so that the disks 30 are precisely located with respect to pickup heads on a transfer arm 98. A sensor 100 commercially available with the cylinder 26 is mounted with respect to the cylinder 26 by a clamp 102. The sensor 100 and clamp 102 are adjusted in a known manner such that the sensor detects the position of the rod 54 being moved to the preset position defined by the point of contact of the movable stop block 92 with the fixed stop block 90. The sensor 100 provides a signal to the controller indicating that the disks 30 are at the extended position.

Thereafter, the controller (not shown) initiates motion of the transfer arm 98 over the disks 30 and lifts the disks from the supports 28. The sensors 70 detect that the disks 30 have been removed, and the respective signals on cables 74 change state. The controller (not shown) then operates solenoids (not shown) to reverse the pressure within the cylinder so that the cylinder rod 54 is moved back into the cylinder 26, thereby moving the sliding element 24 back to the retracted position illustrated in FIG. 1. A sensor 104 similar to the sensor 100 is mounted on the cylinder 26 by a clamp 106. The sensor 104 detects the retracted position of the piston rod 54 and provides a signal to the controller indicative thereof.

Thus, the above described part transfer apparatus 20 is a simple, compact, inexpensive, lightweight and reliable linear slide that has the capability of being able to easily and precisely adjust the terminal position of the sliding element at each end of its travel. The adjustment of the position at either end of slide travel is independent of, and will not alter, the position at the opposite end of slide travel. Further, such adjustment may be made without having to change the mounting or location of the fixed member 22 with respect to its support. In addition, various components and devices, for example, supports 28 and sensors 70, may be easily mounted to the moving element 24 without using bulky, heavy and expensive tooling mounting components. Also, many of the parts of the linear slide 20 are normally made with aluminum so that it may be lightweight and easily mounted to another cylinder or elevator device for changing the height of the linear slide 20. Finally, the linear slide 20 is very compact and is readily located between closely spaced machines or processing stations.

While the invention has been illustrated by the description of one embodiment, and while the embodiment has been described in considerable detail, there is no intention to restrict nor in any way limit the scope of the appended claims to such detail. Additional advantages and modifications will readily appear to those who are skilled in the art. For example, the illustrated embodiment utilizes slide elements 22, 24 which are linear. As will be appreciated, the same principles of the invention may be applied to curved slide elements. In addition, the coupling bracket 60 is described as being threaded onto the shaft 58, thereby providing an adjustment of the exact location of the retracted position of the cylinder. As will be appreciated, the coupling bracket 60 may instead, or in addition to, be adjustably coupled to the end of the moving element 24.

Further, either one of the fixed stop 90 or the movable stop 92 may be attached at a fixed location on their respective elements, and the other of the fixed block 90 and the movable block 92 adjustably mounted to the respective elements. Alternately, both the fixed block 90 and movable block 92 may be adjustably attached to the elements. In addition, the slots 32 and guide keys 38, 39 normally have a T-shaped cross-section; however, the slots 32 and guide keys 38, 39 may also have a dove-tail or similar cross-sectional profile. Alternatively, a simpler cross-sectional profile, for example, one having three mutually perpendicular sides, may also be used.

The preferred embodiment utilizes cylinder position sensors 100, 104 to detect the location of the movable rod within the cylinder and to provide a position feedback confirming motion of the movable element 24 between the extended and retracted positions. As will be appreciated, instead of utilizing position feedback, the system may be operated on an open loop basis in which a timer is started with the actuation of the cylinder. The timer is set to time out after a period of time sufficient to allow the slide 24 to move from one position to the other; and it is assumed that at the end of the period of time, the desired position has been achieved.

Further, while photoelectric sensors 70 are described, as will be appreciated, any type of sensor for detecting the presence and absence of the parts 30 may be used. Although the described embodiment utilizes a pneumatic cylinder to power the movable slide 24, other types of cylinders may be used, and further, the cylinder 26 may be replaced by a motor driven rack and pinion drive, a motor driven chain drive, or other drive to impart motion to the member 24. While two workpiece supports are illustrated and described, any number of work supports may be used.

Therefore, the invention in its broadest aspects is not limited to the specific details shown and described. Consequently, departures may be made from the details described herein without departing from the spirit and scope of the claims which follow.

What is claimed is:

1. A part transfer apparatus comprising:
   a first element having first and second ends and a first longitudinal slot extending along one side of the first element;
   a second element having first and second ends corresponding to the first and second ends of the first element, the second element further having a second longitudinal slot extending along one side of the second element, the one side of the second element being disposed adjacent the one side of the first element;
   an actuator connected to the first element and having a movable rod with a distal end connected near the first end of the second element;
   a first guide block mounted on the second end of the second element, the first guide block having a first guide key disposed within the first slot of the first element, the first slot guiding motion of the second end of the second element;
   a second guide block mounted on the first end of the first element, the second guide block having a second guide key disposed within the second slot of the second element, the second guide key guiding motion of the second element with respect to the first element; and
   a support mounted on the second element for receiving a part.

2. The part transfer apparatus of claim 1 wherein the longitudinal slots in the first and second elements and the guide keys are generally T-shaped, and the first and second guide keys are T-shaped and slidingly engage the T-shaped slots of the first and second elements, respectively.

3. The part transfer apparatus of claim 2 wherein the actuator selectively moves the second element between first and second preset positions and the first and second preset positions are adjustable.

4. The part transfer apparatus of claim 3 further comprising a coupling bracket connected to the first end of the second element and the distal end of the movable rod of the actuator, the coupling bracket being adjustably connected to one of the first end of the second element and the distal end of the movable rod.

5. The part transfer apparatus of claim 4 wherein the coupling bracket is threadedly connected to the distal end of the movable rod for adjusting the first preset position.

6. The part transfer apparatus of claim 5 wherein the coupling bracket is pivotally connected to the distal end of the movable rod.

7. The part transfer apparatus of claim 6 further comprising:
   a fixed stop mounted near the first end of the first element; and
   a movable stop mounted at the second end of the second element, whereby upon the actuator moving to the second preset position, the movable stop contacts the fixed stop, thereby stopping motion of the second element and defining the second preset position.

8. The part transfer apparatus of claim 7 wherein one of the fixed and movable stops is adjustably mounted on the respective first and second elements, thereby permitting the second preset position to be adjustable.

9. The part transfer apparatus of claim 1 further comprising a plurality of supports in a spaced apart relationship on the second element for receiving a plurality of parts.

10. The part transfer apparatus of claim 9 further comprising a plurality of part detectors mounted on the second element in the proximity of the plurality of supports for detecting a presence of the plurality of parts.

11. The part transfer apparatus of claim 1 wherein first and second elements are linear elements.

12. The part transfer apparatus of claim 1 wherein the actuator includes a linear cylinder.

13. The part transfer apparatus of claim 1 further comprising a part detector mounted on the second element for detecting a presence of the part on the support.

14. A part transfer apparatus comprising:
   a first element having first and second ends and a first slot extending along one side of the first element;
   a second element having first and second ends corresponding to the first and second ends of the first element, the second element further having a second slot extending along one side of the second element, the one side of the second element being disposed adjacent the one side of the first element;
   an actuator connected to the first element and having a movable rod with a distal end connected near the first end of the second element, the actuator selectively moving the second element between first and second preset and adjustable positions;
   a first guide block mounted on the second end of the second element, the first guide block having a first guide key disposed within the first slot of the first element, the first slot guiding motion of the second end of the second element;
   a second guide block mounted on the first end of the first element, the second guide block having a second guide key disposed within the second slot of the second element, the second guide key guiding motion of the second element with respect to the first element; and
   a support mounted on the second element for receiving a part.

15. A part transfer apparatus comprising:
   a first element having first and second ends and a first, generally T-shaped longitudinal slot extending along one side of the first element;
   a second element having first and second ends corresponding to the first and second ends of the first element, the second element further having a second, generally T-shaped longitudinal slot extending along one side of the second element, the one side of the second element being disposed adjacent the one side of the first element;
   an actuator connected to the first element and having a movable rod with a distal end connected near the first end of the second element, the actuator selectively moving the second element between first and second preset and adjustable positions;
   a first guide block mounted on the second end of the second element, the first guide block having a first, generally T-shaped guide key disposed within the first slot of the first element, the first slot guiding motion of the second end of the second element;
   a second guide block mounted on the first end of the first element, the second guide block having a second, generally T-shaped guide key disposed within the second slot of the second element, the second guide key guiding motion of the second element with respect to the first element; and
   a support mounted on the second element for receiving a part.

16. The part transfer apparatus of claim 15 further comprising a coupling bracket connected to the first end of the second element and the distal end of the movable rod of the actuator, the coupling bracket being threadedly connected to one of one end of the second element and the distal end of the movable rod.

17. The part transfer apparatus of claim 16 further comprising:
   a fixed stop mounted near the first end of the first element; and
   a movable stop mounted at the second end of the second element, whereby upon the actuator moving to the second preset position, the movable stop contacts the fixed stop, thereby stopping motion of the second element and defining the second preset position.

18. The part transfer apparatus of claim 17 wherein one of the fixed and movable stops is adjustably mounted on the respective first and second elements, thereby permitting the second preset position to be adjustable.

19. A method of transferring a part comprising:
   providing a first element having first and second ends and a first longitudinal slot extending along one side of the first element;
   providing a second element having
      first and second ends corresponding to the first and second ends of the first element,
      a second longitudinal slot extending along one side of the second element, the one side of the second element being disposed adjacent the one side of the first element,
      a support mounted on the second element for receiving a part;

operating an actuator connected to the first element to cause a movable rod of the actuator connected near the first end of the second element to move the second element with respect to the first element, guiding motion of the second element with a first guide block mounted on the second end of the second element, the first guide block having a first guide key disposed within the first slot of the first element;

guiding motion of the second element with a second guide block mounted on the first end of the first element, the second guide block having a second guide key disposed within the second slot of the second element.

20. The method of claim 19 further comprising moving the second element between first and second adjustable preset positions.

21. The method of claim 20 comprising threadedly connecting a coupling bracket to the distal end of the movable rod for adjusting the first preset position.

22. The method of claim 21 comprising adjustably mounting a movable stop on the second element with respect to a fixed stop mounted on the first element.

* * * * *